US010582091B1

(12) United States Patent
Li et al.

(10) Patent No.: US 10,582,091 B1
(45) Date of Patent: Mar. 3, 2020

(54) AUTO-COLOR COPY IN SOFTWARE BASED IMAGE PATH

(71) Applicant: Xerox Corporation, Norwalk, CT (US)

(72) Inventors: Xing Li, Webster, NY (US); Peter McCandlish, Penfield, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/298,439

(22) Filed: Mar. 11, 2019

(51) Int. Cl.
*H04N 1/60* (2006.01)

(52) U.S. Cl.
CPC ......... *H04N 1/6033* (2013.01); *H04N 1/6008* (2013.01); *H04N 1/6019* (2013.01)

(58) Field of Classification Search
CPC ... H04N 1/6033; H04N 1/6019; H04N 1/6008
See application file for complete search history.

(56) References Cited

U.S. PATENT DOCUMENTS

2007/0242297 A1* 10/2007 Eki .......................... H04N 1/56 358/1.9
2016/0381238 A1* 12/2016 Shigeoka ........... G03G 15/6558 358/1.12

* cited by examiner

*Primary Examiner* — Christopher Wait
(74) *Attorney, Agent, or Firm* — Fay Sharpe LLP

(57) ABSTRACT

A method and system for an auto-color detection and color transformation is provided including with at least one image signal processor, splitting an input image into a plurality of strips on a page. Each strip is composed of a plurality of pixels. The presence of color data within a strip is determined. Based on a determination that no color data is present within the strip both a monochrome rendering and a simple color rendering of this neutral strip are generated. Based on a determination that color data is present within a strip, the entire page is declared a color page and either one of a simple color rendering (via 1D look up tables) or a complex color rendering (via tetrahedral interpolation) of the strip is generated. Thereafter, only color renderings of subsequent strips is performed for the corresponding page.

18 Claims, 4 Drawing Sheets

START
302 RECEIVE DOCUMENT
304 SEPARATE DOCUMENT INTO PAGES
306 SPLIT PAGE INTO TILES
307 PERFORM A FIRST COLOR SPACE TRANSFORMATION
308 ANALYZE STRIP
310 NEUTRAL TILE?
NO
YES
314 DECLARE COLOR PAGE
312 GENERATE COLOR AND MONO OUTPUT STRIP
316 GENERATE COLOR OUTPUT STRIP
317 ANOTHER STRIP?
318 ANOTHER STRIP?
YES
NO
320 ANOTHER PAGE?
322 OUTPUT DOCUMENT
END
300
102

AUTO-COLOR COPY IN SOFTWARE BASED IMAGE PATH

CROSS REFERENCE TO RELATED PATENTS AND APPLICATIONS

This application is related to U.S. patent application Ser. No. 16/298,190, filed Mar. 11, 2019 and titled TILE BASED COLOR SPACE TRANSFORMATION, which is incorporated herein by reference in its entirety.

BACKGROUND

The subject disclosure relates to the printing arts, the copying/scanning arts, the image processing arts, the color processing arts, and the like.

While historically images were captured using photographic film, modern digital devices (such as scanners, cameras, etc.) capture images as pixels electronically, and most such digital devices capture images in a color space referred to as RGB, or red-green-blue color space. The RGB color space is utilized by image capture devices because such devices commonly include sensors that distinguish between the red, green, and blue colors.

When processing images captured by digital devices to make color corrections, remove undesirable artifacts, improve image resolution, suppress background, prepare images for printing or display, etc. (which is sometimes referred to as image path processing) it is often useful to first convert the electronic images into a color space that is device independent, such as the CIEL*a*b* color space.

The L*a*b* color space has an L dimension for lightness and a* and b* that are color-component dimensions (green-red and blue-yellow, respectively). The L*a*b* color space includes all perceivable colors, which means that its gamut exceeds those of the RGB and CMYK color spaces. The L*a*b* color space is device independent, which means that the colors are defined independent of their nature of creation or the device they are displayed on.

Multifunction devices, including printing devices, generally operate in a smaller gamut color space, such as the RGB or CMYK color spaces, that are named based on the colors of the marking materials (e.g. inks, toners, etc.) used; such as red, green, and blue (RGB); or cyan, magenta, yellow, and black (CMYK). Thus, in order to print images represented in the L*a*b* color space, the image data must be transformed to either the RGB or CMYK color space.

Auto-color copying and scanning is an important feature of multifunction devices. Auto-color is a mode that generates a color or monochrome output based on an input document without user selection or effort. A document is imaged usually by a scanning device in an RGB color space and printed by a printer, usually in a CMYK color space. Traditionally, in hardware-based image path, neutral page detection is performed on the entire input page and the result is used to control down-stream processing. In some systems for auto-color copy modes, both a device dependent color space (CMYK) and a monochrome rendered binary image are generated while the neutral page detection process is in progress. One of the binary images, either the CMYK or monochrome image, is eventually selected as the output based on the final neutral page detection result.

Software based image path has recently experienced wider adoption due to its advantage in cost and flexibility over hardware-based image path. However, one key challenge in implementing a software-based image path is performance optimization. It is desirable to identify and make use of every opportunity to reduce the processing time to enhance system performance. Currently, in a software-based image path, the auto-color feature is implemented the same way as in the hardware-based image path, which is not as efficient as possible. That is, in hardware image paths, CMYK and monochrome images are simultaneously generated while the neutral page detection is in progress. In a software-based image path, it is desirable to reduce the amount of processing and time in order to improve the overall system performance, e.g., the amount of computations may be reduced by terminating monochrome renderings when color is detected.

Accordingly, a method and system to improve the auto-color feature of multifunction devices utilizing software-based image path with increased efficiency, faster processing, and improved quality is needed.

INCORPORATION BY REFERENCE

"Control of Color Imaging Systems: Analysis and Design", CRC Press (2009), ISBN-13: 9780849337468;

"Digital Color Imaging Handbook", 1st Ed., CRC Press (2003), ISBN-13: 97808-4930-9007;

U.S. Pat. No. 8,165,388 to Xing Li., issued Apr. 24, 2012 and titled NEUTRAL PIXEL DETECTION IN AN IMAGE PATH;

U.S. Pat. No. 8,775,281 to Xing Li, issued on Jul. 8, 2014 and titled COLORDETECTION FOR TIERED BILLING IN COPY AND PRINT JOBS; are each incorporated herein by reference in their entirety.

BRIEF DESCRIPTION

This disclosure proposes a novel solution that significantly improves the performance in executing an auto-color detection function, that may be commonly found on multi-function office devices. An auto-color function detects, during the scanning of documents, whether or not a page contains color. This avoids a user needing to manually specify before scanning the document whether the output should be in color or monochrome. Briefly, a neutral page detection module examines the input page on a strip by strip basis. If a strip is detected as neutral and the page has not been declared a "color page" based on the strips examined so far, then two versions of output renderings are generated for that strip: a color rendering and a monochrome rendering. If the strip is detected as containing color content, the page is declared a "color page." When the page is declared a color page, the monochrome version of output strips is no longer generated starting from that first color determined strip. Rather, only a color version of a strip will be generated.

According to one embodiment, there is provided a method for auto-color mode detection and color transformation. The method includes, with at least one image signal processor, splitting an input image into a plurality of strips on a page, where each strip is composed of a plurality of pixels. The method further includes determining the presence of color data within a strip of the plurality of strips. Upon a determination that no color data is present within the strip both a monochrome rendering and a color rendering of a neutral strip are generated. Upon a determination that color data is present within a strip, the page is declared a color page and a color rendering via 1D look up tables or tetrahedral interpolation of the strip is generated.

According to another embodiment, there is provided a multifunction device with an auto-color copy feature. The multifunction device includes at least one image signal processor and a memory in communication therewith. The memory stores instructions which are executed by the at least image signal processor to receive an input image and separate the input image into a plurality of strips of a page, wherein each strip of the plurality of strips is composed of a plurality of pixels. The instructions, which are executed by the at least one image signal processor, also determine the presence of color data within a strip of the plurality of strips. Upon a determination that no color data is present within the strip, a monochrome rendering and a color rendering of a neutral strip are generated, wherein after detection of the neutral strip, a next strip is processed by first determining the presence of color data within the next strip. Upon a determination that color data is present within a strip, the page is declared a color page and only a color rendering of the strip is generated. After a color page is declared, only color renderings of each of the remaining strips of the page are generated. The instructions further provide generating an output image, the output image is the input image wherein the color space has been converted to an output device dependent color space.

According to another embodiment, there is provided a system with an auto-color feature. The system includes at least one image signal processor configured to receive an input image and a memory in communication therewith. Also included is a strip segmentation module in communication with the image signal processor configured to split the input image into a plurality of strips, wherein each strip composed of a plurality of pixels. An input color conversion module in communication with the at least one image signal processor is configured to convert each strip of the plurality of strips to a device independent color space. A color detection module, also in communication with the at least one image signal processor, is configured to detect a presence and an absence of color data within a strip of the plurality of strips, wherein upon a detection of color, a page is determined to be a color page. An output color conversion module in communication with the at least one processor, upon detection of the absence of color data within a strip of the plurality of strips, converts the strip to a device dependent color space, generating a monochrome rendering and a simple color rendering of the strip so long as the page has not yet been determined to be a color page. Upon determination of a color page, the output color conversion module converts the strip and all remaining strips of a page to a device dependent color space utilizing tetrahedral interpolation.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
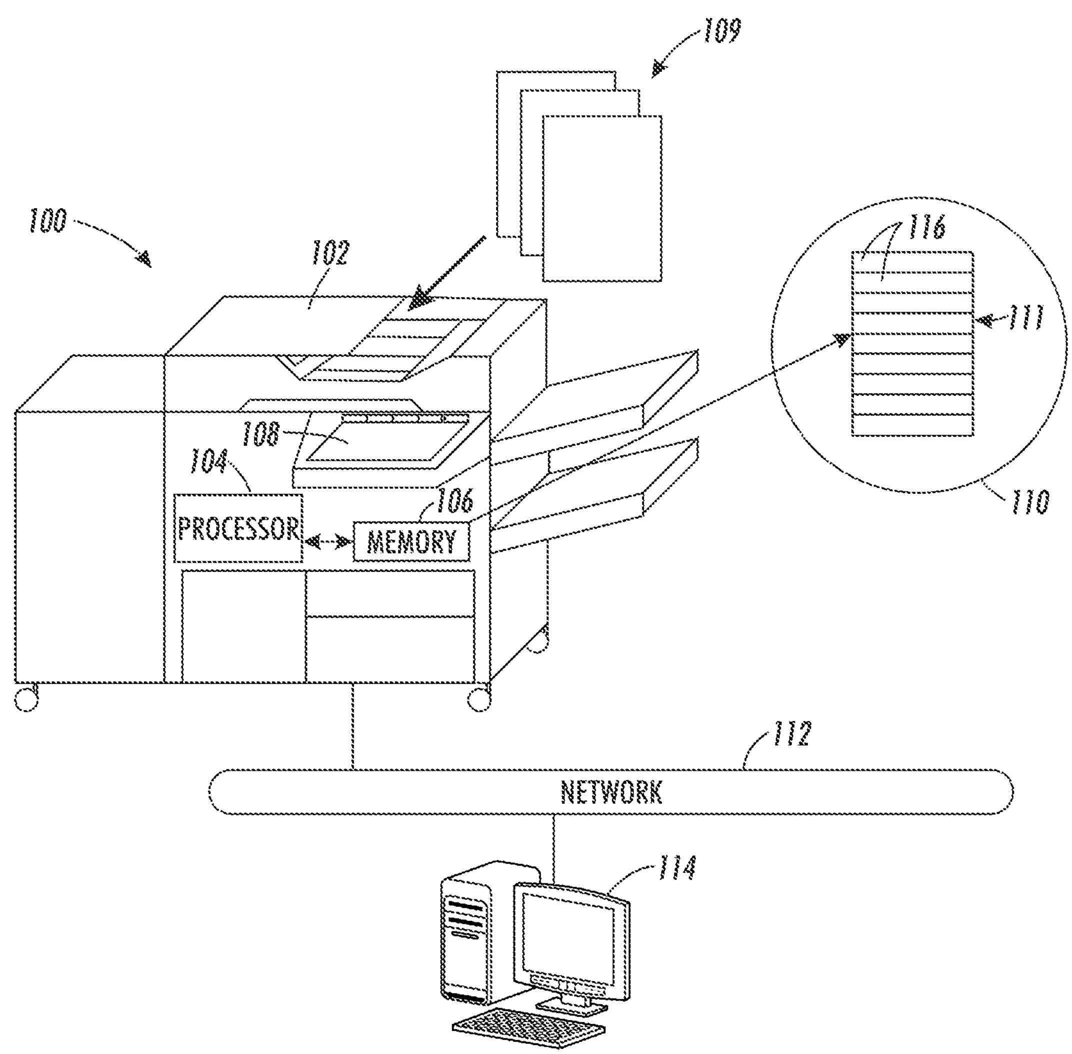
FIG. 1 is an illustration of a multifunction system with an auto-color feature in accordance with one embodiment of the subject application.

One or more embodiments will now be described with reference to the attached drawings, wherein like reference numerals are used to refer to like elements throughout. Aspects of exemplary embodiments related to systems and methods for color image printing are described herein. In particular, disclosed herein are embodiments utilizing strip-based color detection and processing to increase color image processing speed and efficiency, while improving output documents. In addition, example embodiments are presented hereinafter referring to color space conversion from L*a*b* to CMYK, and the like, however, application of the systems and methods set forth can be made in other areas, as will be appreciated by those skilled in the art.

NON-LIMITING DEFINITIONS

A "Device-Independent Color Space" is a color space that in no way depends on any measurement or color reproduction device. CIE XYZ tristimulus color space is one example of a device-independent color space. Other common device-independent color spaces are CIE L*u*v*, CIE L*a*b*, and LCH, which are obtained from XYZ using non-linear transformations which are well understood in this art. For non-linear transformations pertinent to device-independent color spaces, see Appendix A.6.1 of the above-referenced text: "*Control of Color Imaging Systems: Analysis and Design*," which is incorporated by reference.

A "Device-Dependent Color Space" is a color space that, in at least one way, depends on any measurement or color reproduction device. An Example of a device-dependent color space is monitor RGB space or printer CMYK space.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server or other location to perform certain functions.

Turning now to FIG. 1, there is shown an example system 100 that may be used for auto-color processing of documents in accordance with the example embodiments described herein. The system 100 addresses the need for systems and methods that enable document processing devices, such as multifunction devices, print servers, personal computers, and the like, to improve performance by speeding up the color space transformation function, resulting in faster and more efficient color document detection, reproduction and processing, as well as improved quality of the color images printed by such devices. It will be appreciated that the various components depicted in FIG. 1 are for purposes of illustrating aspects of the subject application and that other similar components implemented via hardware, software, or a combination thereof, are capable of being substituted therein.

It will be appreciated that the system 100 of FIG. 1 is capable of implementation using a distributed computing environment, such as a computer network 112, which is representative of any distributed communications system capable of enabling the exchange of data between two or more electronic devices. It will be further appreciated that such a computer network 112 includes, for example and without limitation, a virtual local area network, a wide area network, a personal area network, a local area network, the Internet, an intranet, or any suitable combination thereof. Accordingly, such a computer network 112 comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

The exemplary system 100 includes a multifunction device 102, representative of any computing system, which comprises at least one processor 104 (described in greater detail as the processor 202 of FIG. 2) that executes and a memory 106 (described in greater detail below as the memory 204 of FIG. 2) that stores computer-executable instructions for providing the various functions, calculations, segmentations, selections, and the like, described herein. It will be appreciated that the multifunction device 102 is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction device 102 is capable of being employed as one possible hardware configuration to support the systems and methods described herein. The skilled artisan will further appreciate that although the multifunction device 102 is illustrated as a standalone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction device 102 may include a computer server, workstation, personal computer, combination thereof, or any other computing device.

The multifunction device 102 includes a system bus (such as the bus 212 of FIG. 2) that couples various system components including the system memory 106 to the at least one processor 104. The at least one processor 104 can be any of various commercially available processors. The at least one processor 104 can be variously embodied, such as by a single-core processor, a multi-core processor, a digital processor and cooperating math coprocessor, a digital controller, central processing unit (CPU), graphics processing unit (GPU) or the like. The at least one processor 104, in addition to controlling the operation of the multifunction device 102, executes instructions stored in memory 106 for performing the methods described more fully below.

The multifunction device 102 typically includes at least some form of computer readable media. Computer readable media can be any available media that can be accessed by the multifunction device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the multifunction device 102 through an input device 108 (see, e.g. FIG. 2) such as a touch-screen interface, a keyboard, a pointing device, such as a mouse, stylus, voice input, or graphical tablet. The multifunction device 102 is capable of operating in a networked environment using logical and/or physical connections to one or more remote computers, such as a remote computer(s), depicted as the network 112 of FIG. 1. The logical connections depicted include a local area network (LAN) and a wide area network (WAN). Such networking environments are commonplace in offices, enterprise-wide computer networks, intranets and the Internet. Additional functioning of the multifunction device 102 is discussed in greater detail below with respect to the example multifunction device system 200 of FIG. 2.

According to one embodiment, the memory 106 stores an input image 110 of an original document 109 generated via operations of the multifunction device 102. As will be appreciated by those skilled in the art, the original document 109 may comprise one or more physical pages. While the input image 110 is illustrated as a single page 111 in FIG. 1, it is to be appreciated that the input image 110 includes data from each page if indeed the original document 109 comprises multiple pages. Furthermore, the input image 110 of the document may include text portions and image portions. In some embodiments, the multifunction device 102 generates the input image 110 via scanning of a hardcopy document 109, as will be understood by those skilled in the art. In other embodiments, the input image 110 may be further processed such that the image data of the input image 110 is separated into one or more pages 111, corresponding to each page of physical document 109.

As illustrated in FIG. 1, the exemplary system 100 may also include a user device 114 in data communication with the network 112. It will be appreciated that the illustration of the user device 114 as a personal computer is for example purposes only and the subject application is capable of implementation via any suitable computing device including, for example and without limitation, a netbook computer, a laptop computer, a workstation computer, a smartphone, a personal data assistant, a web-enabled cellular telephone, a smart phone, a proprietary network device, or other web-enabled electronic device.

Although not shown, the user device 114 may include a processor, a system memory, a system storage, buses that couple various system components including the system memory to the processing unit, and the like. The user device 114 may be suitably configured to interact with the multifunction device 102, to access the data storage, submit color selections, submit job processing options, display color editors, generate a graphical user interface, and otherwise interact with users, and the like. In embodiments wherein, the user device 114 is separate from the multifunction device 102, the user device 114 may include a web-browser, dedicated application, or other thin client interface, e.g., stored in memory, which is operable to interact with the multifunction device 102. It will be appreciated that the processor and memory of such a standalone user device 114 can be configured as set forth above with respect to the at least one processor 104 and memory 106 of the multifunction device 102.

It will be appreciated that the data communications between the multifunction device 102 and the user device 114 may be accomplished via any suitable channel of data communications via the network 112 known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications. In accordance with one embodiment of the subject application, the user device 114 is suitably configured to interact with the multifunction device 102 to facilitate document processing, send one or more documents to the multifunction device 102 for processing, and the like.

The memory 106 may represent any type of non-transitory computer readable medium such as random-access memory (RAM), magnetic disk or tape, optical disk, flash memory, or holographic memory. In one embodiment, the memory 106 comprises a combination of random-access memory and read only memory. In some embodiments, the at least one processor 104 and memory 106 may be combined in a single chip. Memory 106 may store data the processed in the method as well as the instructions for performing the exemplary method.

Figure 2:
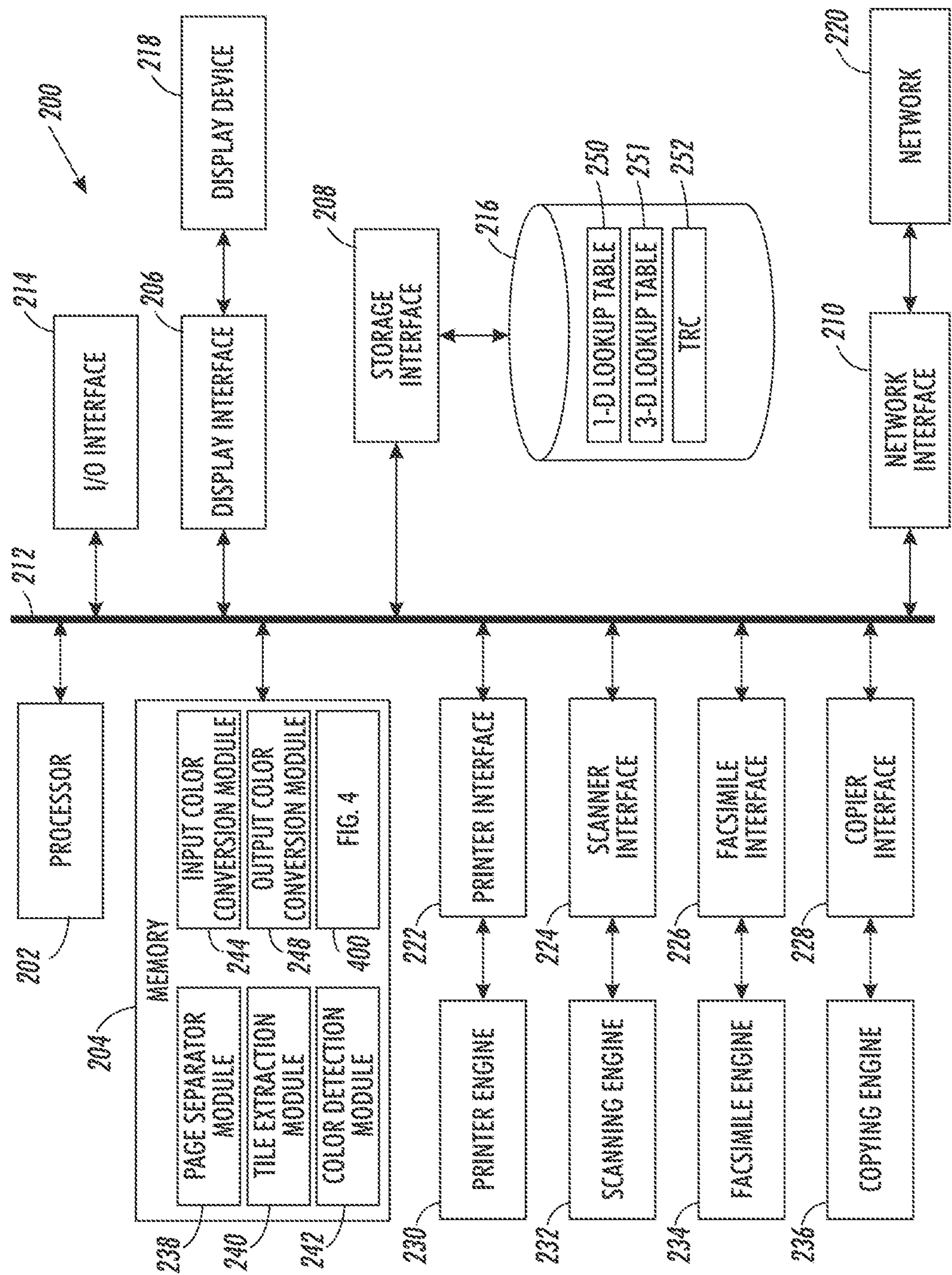
FIG. 2 is a block diagram of a multifunction system for in accordance with one embodiment of the subject application.

Turning now to FIG. 2, illustrated is a representative multifunction device 200 (depicted in FIG. 1 as the multifunction device 102) that facilitates auto-color processes in connection with one embodiment of the subject application. The multifunction device 200 includes at least one processor unit 202 (shown as the at least one processor 104 in FIG. 1) which is advantageously placed in data communication with memory 204 (shown as the memory 106 in FIG. 1), which may include, for example and without limitation, non-volatile read only memory, volatile read only memory, random access memory or a combination thereof, a display interface 206, a storage interface 208, and a network interface 210. In one embodiment, interfacing with the foregoing modules is suitably accomplished via a bus 212. The at least one processor 202 executes, and the memory 204 stores computer-executable instructions for performing the various functions, methods, steps, techniques, and the like, described herein. The at least one processor 202 and memory 204 may be integral to each other or remote but operably coupled to each other. It is to be appreciated that in some embodiments, the at least one processor 104 includes processor of the multifunction device 102 and the processor of a user device 114.

The memory 204 suitably includes firmware, such as static data or fixed instructions, such as BIOS, system functions, configuration data, and other routines used for the operation of the multifunction device 200 via the at least one processor 202. The memory 204 is further capable of providing a storage area for data and instructions associated with applications and data handling accomplished by the at least one processor 202. The memory 204 may further include one or more instructions, or modules, configured to be executed by the at least one processor 202 to perform one or more operations, such as operations associated with the multifunction device 200. In some embodiments, the instructions include an image path, such as the image path 400 provided in FIG. 4. The one or more modules are described in greater detail below.

The display interface 206 receives data or instructions from other components on the bus 212, which data is specific to generating a display to facilitate a user interface. The display interface 206 suitably provides output to a display device 218, suitably a video display such as a monitor, LCD, plasma, or any other suitable visual output device as will be appreciated by one of ordinary skill in the art.

As will be appreciated by those skilled in the art, the storage interface 208 is configured to provide a mechanism for non-volatile, bulk or long-term storage of data or instructions in the computer system 200. The storage interface 208 suitably uses a storage mechanism, such as storage 216, suitably comprised of a disk, tape, CD, DVD, or other relatively higher capacity addressable or serial storage medium. The storage 216 may store look-up tables such as 1-D look-up table 250 and 3-D look up table 251, sets of tone reproduction curves 252, and the like.

The network interface 210 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration of FIG. 2, the network interface 210 is connected to a physical network 220, suitably comprised of a local area network, wide area network, or a combination thereof.

An input/output interface 214 in data communication with the bus 212 is suitably connected with input devices, such as a keyboard, mouse, pointing device, touch screen inputs, or the like. In addition, the input/output interface 214 is further capable of data input and output to or from a peripheral interface, such as a USB, universal serial bus output, SCSI, IEEE 1394 output, or any other interface as may be appropriate for a selected application.

Also, in data communication with the bus 212, are interfaces to one or more document processing engines. As illustrated in FIG. 2, the multifunction device 200 includes a printer interface 222, a scanner interface 224, a copier interface 228, and a facsimile interface 226. According to one embodiment of the subject application, the preceding interfaces 222-228 facilitate respective communication with a printer engine 230, a scanning engine 232, a facsimile engine 234, and a copying engine 236. It is to be appreciated that the multifunction device 200 suitably accomplishes one or more document processing functions.

It is to be appreciated that the printer engine 230 suitably enables the output of physical documents representing an electronic document communicated to the multifunction device 200. It will also be appreciated that the scanning engine 232 is suitably adapted to receive hard copy documents, such as document 109 of FIG. 1, and generate electronic image data therefrom. According to certain embodiments of the subject application, the scanning engine 232 is capable of generating such image data from tangible documents in a variety of forms, including, for example and without limitation, bitmapped data, vector data, page description language formatted data, and the like. The copying engine 236 is suitably adapted to operate in conjunction with the scanning engine 232 and the printer engine 230 so as to generate tangible copies of input documents, as will be appreciated by those skilled in the art. In accordance with one embodiment, the facsimile engine 234 communicates to or from external facsimile devices (not shown).

As illustrated in FIG. 2, the multifunction device 200 includes several modules, such as a page separator module 238, a strip extraction module 240, a color detection module 242, an input conversion module 244, and an output color conversion module 248. Each of the modules shown in the multifunction device 200 may also be considered a device e.g., physical components of the multifunction device, and, therefore, the terms "device" and "module" are used interchangeably herein. Furthermore, the devices or modules illustrated in FIG. 2 are not meant to be limiting. It is to be understood that any number of elements or modules may be used and that additional operations or processes besides those described below may be provided.

The page separator module 238 receives the input image 110 from the multifunction device 102. The input image 110, in some embodiments, is generated by the scanning engine 232 of the multifunction device. For example, an original document 109 may be scanned by the multifunction device 102. In other embodiments, the input image 110 is imported to the multifunction device 102 from either I/O interface 214 or network interface 210. For example, an original document 109 may comprise one or more pages, when the original document is scanned, the image data from each page of the original document 109 is bundled into input image 110. The page separator module 238 processes the input image 110 such that the input image can be processed on a page by page basis, for example page 111.

The strip extraction module 240 further splits the input image 110, separated into pages 111, into strips 116. Strips 116 correlate to pixel areas of the image data taking into account the image resolution. That is, for example and without limitation a strip 116 may be representative of an area of about 6600×32 pixels for 600 dpi resolution images and may be representative of an area of about 3300×32 pixels for 300 dpi resolution. It is to be appreciated that the area of the strip 116 includes one dimension that runs along an entire page dimension, e.g., a dimension of a strip 116 may be all the pixels along a length of a page or all the pixels along the width of a page. However, the area of the strip 116 is non-limiting and any size may be generated, as other non-limiting examples, a strip may be defined as 6624×16, 6624×32, 5120×32 pixels. In some embodiments, the strips 116 may be processed sequentially or in parallel. That is, strips 116 may be processed individually from top to bottom or vice versa. The first strip processed may be the top strip of the page 111, and the last strip to be processed may be the bottom strip of the input image. In other embodiments, each strip 116 is processed simultaneously on the same or different processors associated with the same device.

Generally, the input image 110 contains image data in RGB color space. The input color conversion module 244 converts the "RGB" color space to a device independent color space such as a L*a*b* color space. Conversions from RGB to L*a*b* are known in the art, for example and without limitation, U.S. Pat. No. 9,025,222 "Scanner Calibration Using Inverse Matrix" which is incorporated by reference in its entirety herein.

The color detection module 242 analyzes an extracted portion, such as strip 116, of the input image 110 to determine if the extracted portion includes color data. In some embodiments, the color detection module 242 determines if a strip 116 of a page 111 of an input image 110 includes color data. The color detection module 242 allows for the separation of image data based on color. If a portion of the image data 110, for example and without limitation, a strip 116, does not include color data, the strip 116 is processed by the output color conversion module 248 using simple 1D lookup tables 250 to generate a color rendering of the strip 116 and by L* to K conversion to generate a monochrome rendering of the strip 116. If a portion of the image data 110, again for example strip 116, includes color data, the strip 116 may be processed by methods more complex than 1D look up tables via output color conversion module 248, for example and without limitation, interpolation methods such as tetrahedral interpolation to generate a color rendering of the strip 116. When a strip 116 is detected as having color, a monochrome rendering of that strip 116 is not rendered. In some embodiments, the neutral and non-neutral pixels of a strip 116 may be determined based on, for example and without limitation, chroma calculation, luminance-based threshold adjustment, and a final count determination such as the method described in U.S. Pat. No. 8,775,281 to Xing Li, issued on Jul. 8, 2014 and titled COLORDETECTION FOR TIERED BILLING IN COPY AND PRINT JOBS incorporated by reference herein.

In some embodiments, when the color detection module 242 detects color within a strip 116, the page 110 is declared a "color page." When a page is determined to be a color page, the subsequent strips of the page are no longer analyzed for color, rather, each subsequent strip is processed using a method more complex that 1D look up tables. In these embodiments, only a color rendering of the image is produced, i.e., monochrome renderings are no longer generates.

In some embodiments, when the page 110 is declared a "color page", strips 116 are still analyzed by the color detection module 242. Here, computational time may be saved for strips 116 on a "color page" that are determined to be neutral. That is, for neutral strips of a color page, the more complex methods of color transformation, e.g., tetrahedral interpolation, are substituted with less complex transformation methods (e.g., 1D look up tables). In these embodiments, color containing strips are processed by the output color conversion module 248 via the complex methods and neutral strips are processed the output color conversion module 248 via 1D look-up tables to generate color renderings. Computational time is saved by generating color renderings only, foregoing the simultaneous generation of a monochrome rendering.

Figure 3:
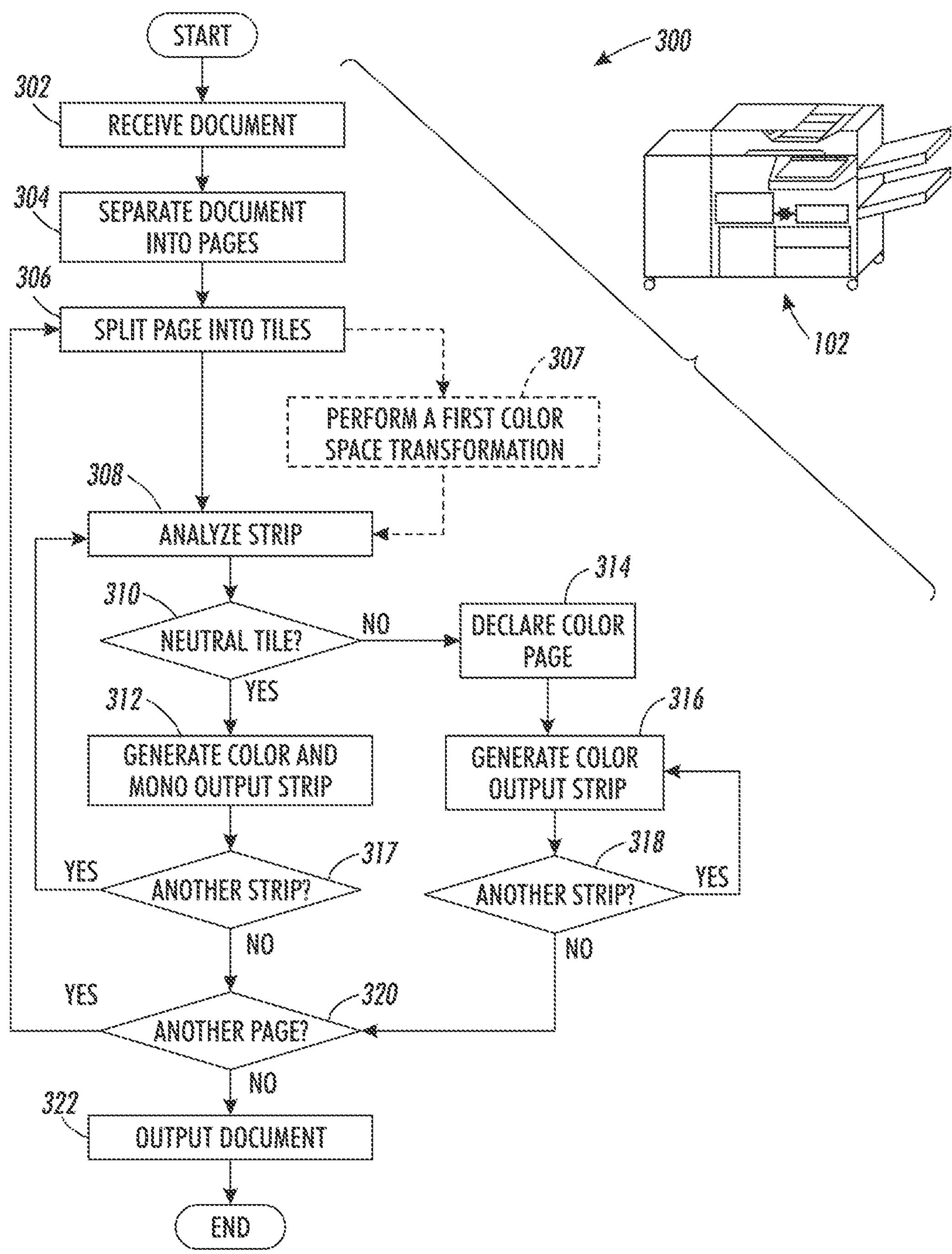
FIG. 3 is a flowchart illustrating a method of strip-based color processing in accordance with one embodiment of the subject application.

Turning now to FIG. 3, there is shown a flowchart 300 illustrating a method for auto-color features of the multifunction device 200 according to one embodiment. In particular, flowchart 300 depicts a method for converting a document to a CMYK color space utilizing one-dimensional and three-dimensional conversion processes. The methodology of FIG. 3 begins at 302, whereupon an input image, such as input image 110 of FIG. 1, is received by the at least one image signal processor 202 of the multifunction device 200. That is, the input image 110 may be received via copying, scanning, printing, or other operations associated with the multifunction device 200. In some embodiments, the at least one image signal processor 202 separates the input image 110 into individual pages 111 at 304 corresponding to each page of the original document 109.

At 306, the image signal processor 202 splits a page 111 into strips 116. In one embodiment, each strip 116 corresponds to about 6600 by 32 pixels, although it will be appreciated that other size strips may be used. In some embodiments, the number of strips 116 and strip size is predetermined by settings in the multifunction device. In other embodiments, the number of strips 116, and strip size is dependent on the size of the input image 110.

In some embodiments, at 307, the at least one image signal processor 202 operative via the input color conversion module 244, performs a conversion from "device dependent color space" to device independent color space. That is, an input image 110 may be in an RGB colors pace, if for example it was obtained via a scanning device. As previously discussed, "device dependent" color space or image data is a color scheme which is tied to or related to color production by a machine, such as a printer, scanner or monitor. Typical device "dependent color spaces", include for example and without limitation red-green-blue (RGB) or cyan-magenta-yellow-black (CMYK) color spaces. On the other hand, "device independent" color space, is a color scheme which is not tied to the color production by a machine. Typical device independent color spaces include, for example and without limitation, CIE XYZ and CIE L*a*b* color spaces. Device dependent color space values, such as RGB and CMYK, may be converted to a device independent color space and vice-versa. Conversion from device dependent color space to device independent color space may be accomplished for example and without limitation by using transformation algorithms and/or look-up-tables (LUT), as known in the art.

The first color space transformation at 307 while optional, may be particularly useful when the input image 110 is in an RGB color space. Conversation from the RGB color space to a device independent color space such as L*a*b*, allows for easier processing of the input image 110.

At 308, each strip 116 is analyzed at 310 for color content. That is, each strip 116 is evaluated for black and white (or gray) pixels and color pixels in the image data. If no color pixels or content are detected, i.e. the strip 116 is a neutral strip, then, at 312, two versions of output are generated for that strip, a monochrome rendering and a simple color rendering. The simple color rendering may be generated by applying 1D look-up-table (LUT) 250 or tone reproduction curves (TRC) 252 that convert L* to CMYK instead of the tetrahedral interpolation based La*b* to CMYK. In some embodiments, the neutral and non-neutral pixels of a tile may be determined based on determinations including, chroma calculation, luminance-based threshold adjustment, and a final count determination, such as the method described in U.S. Pat. No. 8,775,281. Once the strip 116 is converted to device dependent color space, at step 312, the process restarts at 308 for the next strip if another strip is detected at 317. That is, the next strip will undergo an analysis for color content and two strip renderings will be created.

If the image signal processor 202 at 310 detects that the strip 116 contains color pixel data, i.e. the strip 116 is not neutral, then the page is declared a "color page" at 314 by the image signal processor. Next, the strip 116 of the color page is converted to a device dependent color space, such as CMYK color space. That is, strips are processed at 316 such that only a color rendering of the strip is generated. Once the strip 116 is converted to device dependent color space, at step 316, if another strip is detected at 318, then the process restarts at 316 skipping the strip color analysis blocks of 308 and 310.

Once each strip 116 associated with a page 111 has been evaluated and converted, the method 300 evaluates the input image 110 at 320 to determine if another page exists. Upon detection of another page, the process restarts at 306, wherein the next page is split into strips 116. When no more pages are detected, the processed image is output at 322.

Figure 4:
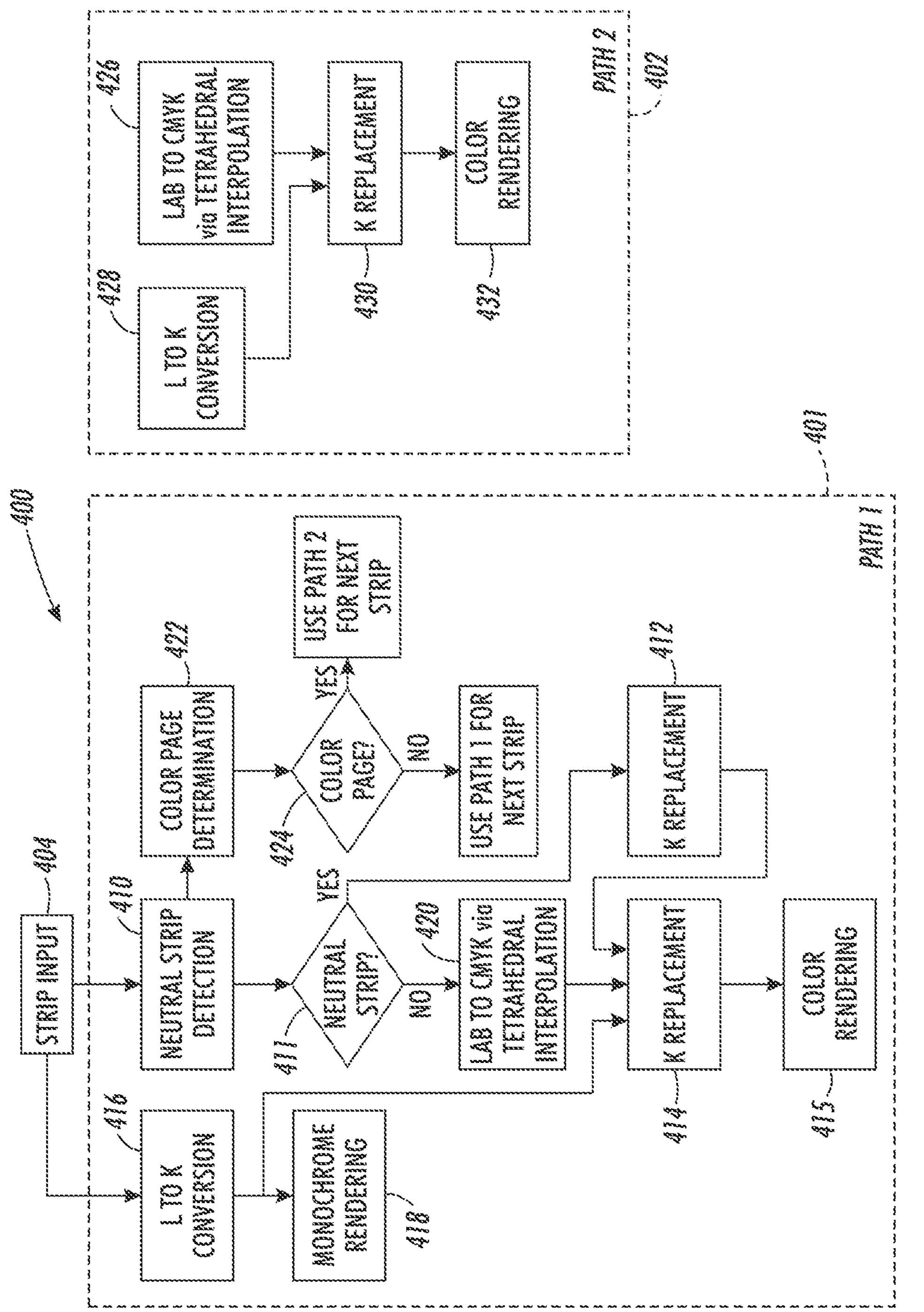
FIG. 4 illustrates a software-based image path in accordance with one embodiment of the subject application.

FIG. 4 illustrates simplified block diagram of a software-based image path 400. The processing is facilitated by an image signal processor such as image signal processor 202 of FIG. 2. The image signal processor 202 may be a digital signal processor (DSP), central processing unit (CPU) and/or graphics processing unit (GPU) that can be found in some Systems on a Chip (SoC). The image signal processor 202 receives, at 404, an image strip 116 for processing. The processing may follow Path 1 401 or Path 2 402 depending on whether the page 111 is determined to be a "color page." In Path 1 401, the processor 202, at 410 detects and if a strip is neutral or it contains color content. If the strip is detected as neutral at 411, the L*a*b* color space is converted to CMYK via 1D look up tables at 412. The K replacement block 414, replaces some color components with an amount of black, for the purpose of avoiding color fringing around black text. A rendering of the neutral strip is produced at 415.

Each pixel of the strip has a specific luminance L* and chrominance a* and b*. Simultaneous with the image processing from 411 to 412 to 414 the luminance L* of the strip 116 is converted to K (device black) at 416 to produce a monochrome rendering 418. That is, the image path 400 creates a monochrome rendering 418 and a color rendering 415 of a neutral strip.

If at 410 and 411, the strip is determined not to be neutral, i.e., it contains color data then, at 420, the strip 116 is converted to a device dependent color space using a method more complex than one dimensional look up tables, e.g., tetrahedral interpolation. This is followed by replacement of some color components with an amount of black at 414 to produce a complex color rendering of the color containing strip.

Simultaneous with the neutral strip detection 410, color page determination 422 determines if the page 111 is a "color page." That is, if a strip is detected as containing color, the page 111 is tagged as a "color page" for all subsequent processing. When a page 111 is declared a "color page" at 424, the processing follows the second path (Path 2 402) wherein the monochrome rendering operation is no longer performed. Here, regardless of whether the strip 116 is neutral or contains color, a transformation to device dependent color space using methods more complex than one dimensional look up tables is performed at 426. The luminance L* of the strip 116 is, at the same time, converted to K (device black) at 428. K replacement is performed at 430 replacing some color components with an amount of black. A color rendering of the strip is produced at 432.

It is to be appreciated that each new page of an input image 110 starts with Path 1 401; once Path 2 402 is invoked the rest of the strips 116 of that page 111 will stay with Path 2 402.

In some embodiments, after the page 111 is determined as a "color page", neutral strip detection 410 is performed. If the strip 116 is determined as neutral, then 1D L* to CMYK instead of tetrahedral conversion is used for the color conversion generating a simple color rendering only.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory (“ROM”); random access memory (“RAM”); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. § 112(f) unless the words “means for” or “step for” are explicitly used in the particular claim.

What is claimed is:

1. A method for auto-color transformation, the method comprising:

with at least one image signal processor, splitting an input image into a plurality of strips on a page, each strip comprising a plurality of pixels; and determining the presence of color data within a strip of the plurality of strips;

upon a determination that no color data is present within the strip, generating a monochrome rendering and a color rendering of a neutral strip, upon a determination that color data is present within a strip, declaring the page as a color page and generating only the color rendering of the strip.

2. The method according to claim 1, wherein after detection of the neutral strip, a next strip is processed by first determining the presence of color data within the next strip.

3. The method according to claim 1, wherein after a color page is declared, only the color rendering of each of the remaining strips of the page is generated.

4. The method according to claim 1, further comprising: performing a first color space transformation of the input image from a device dependent color space to a device independent color space before determining the presence of color within the strip.

5. The method according to claim 1, wherein generating the color rendering of the neutral strip comprises converting the plurality of pixels of the strip from a device independent color space to a device dependent color space via one of one-dimensional look-up tables and one-dimensional tone reproduction curves.

6. The method according to claim 1, wherein generating the color rendering of the color page strip comprises converting the plurality of pixels from the device independent color space to the device dependent color space using a method more complex than one-dimensional look up tables.

7. The method according to claim 6, wherein the method more complex than one dimensional look up tables is tetrahedral interpolation.

8. The method according to claim 1, wherein the input image is received by the image signal processor from a scanning device.

9. A system comprising memory storing instructions for performing the method of claim 1, and a processor in communication with the memory executing the instructions.

10. A multifunction device for performing an auto-color function comprising:

at least one image signal processor and a memory in communication therewith, wherein the memory stores instructions which are executed by the at least image signal processor to:

receive an input image;

separate the input image into a plurality of strips of a page, wherein each strip of the plurality of strips comprises a plurality of pixels;

determine the presence of color data within a strip of the plurality of strips;

upon a determination that no color data is present within the strip, generate a monochrome rendering and a color rendering of a neutral strip, wherein after detection of the neutral strip, a next strip is processed by first determining the presence of color data within the next strip, upon a determination that color data is present within a strip, declare the page as a color page and generate only the color rendering of the strip, wherein after a color page is declared, only the color rendering of each of the remaining strips of the page is generated generate an output image wherein the output image is the input image wherein the color space has been converted to an out device dependent color space.

11. The multifunction device according to claim 10, further comprising a scanning device for generating the input image.

12. The multifunction device according to claim 10, wherein the image signal processor is configured to perform a first color space transformation of the input image converting the input image from a device dependent color space to a device independent color space before determining the presence of color within the strip.

13. The multifunction device according to claim 10, wherein generating the color rendering of the neutral strip comprises converting the plurality of pixels of the strip from a device independent color space to a device dependent color space via one of one-dimensional look-up tables and one-dimensional tone reproduction curves.

14. The multifunction device according to claim 10, wherein generating the color rendering of the color page strip comprises converting the plurality of pixels from the device independent color space to the device dependent color space using a method more complex than one-dimensional look up tables.

15. The multifunction device according to claim 14, wherein the method more complex than one-dimensional look-up tables is tetrahedral interpolation.

16. The multifunction device according to claim 10, wherein the output device dependent color space is a CMYK color space.

17. The multifunction device according to claim 10, further comprising a print engine configured to print the output image.

18. A system for strip-based color space transformation comprising:

at least one image signal processor configured to receive an input image;

a memory in communication therewith;

a strip segmentation module in communication with the image signal processor configured to split the input image into a plurality of strips, each strip comprising a plurality of pixels;

an input color conversion module in communication with the at least one image signal processor configured to convert each strip of the plurality of strips from a device dependent color space to a device independent color space;

a color detection module in communication with the at least one image signal processor configured to detect a presence and an absence of color data within a strip of the plurality of strips, wherein upon a detection of color, a page is determined to be a color page;

an output conversion module in communication with the at least one processor wherein responsive to detection of the absence of color data within a strip of the plurality of strips and as long as the page has not yet been determined to be a color page, the output conversion module converts the strip from the device independent color space to a device dependent color space, generating a monochrome output and a color output of the strip and wherein responsive to detection of color data, the output module converts the strip and all remaining strips of a page from the device independent color space to a device dependent color space utilizing tetrahedral interpolation.

* * * * *